United States Patent [19]

Hatfield

[11] Patent Number: 4,536,160

[45] Date of Patent: Aug. 20, 1985

[54] COMPUTER KEYBOARD EDUCATIONAL TOY

[76] Inventor: John F. Hatfield, 4314 Shamrock Way, Castro Valley, Calif. 94546

[21] Appl. No.: 653,066

[22] Filed: Sep. 21, 1984

[51] Int. Cl.³ .......................... G09B 13/00; A63F 9/08
[52] U.S. Cl. ................................ 434/227; 273/157 R; 434/259; 434/330
[58] Field of Search ............... 434/227, 259, 330, 340; 273/156, 157 R

[56] References Cited

U.S. PATENT DOCUMENTS 565,179 8/1896 Rhodes ................................ 434/227
3,015,895 1/1962 Stall .................................... 434/340
3,380,176 4/1968 Kling et al. ......................... 434/330

Primary Examiner—William H. Grieb
Attorney, Agent, or Firm—Linval B. Castle

[57] ABSTRACT

An educational toy for teaching small children alphanumeric characters and their positions on a conventional keyboard includes a flat base unit having a plurality of surface slots extending partially through the base and second slots between the bottom of the surface slots and the bottom surface of the base to a metallic bottom plate. Keys are represented on the top surfaces of bars having exterior shapes that fit within the surface slots and with magnet tipped extensions that fit within the second slots. The slots and keyboard bars are uniquely shaped so that each bar can only fit into its respective slot to form a completed assembly similar to a conventional keyboard.

4 Claims, 4 Drawing Figures

COMPUTER KEYBOARD EDUCATIONAL TOY

BRIEF SUMMARY OF THE INVENTION

This invention relates to educational toys for young children and particularly to a novel toy that teaches alphanumeric characters and their positions on a keyboard such as a computer keyboard.

Part of the training of very young children includes pattern recognition in toys wherein, for example, pegs of different cross sectional configuration or dimensions must be placed in matching holes in a surface. The present educational toy is of such a type in that it employs bars of various cross sectional dimensions and configurations which are fitted into corresponding slots in a board surface. The top surfaces of the bars are shaped as alphanumeric keyboard keys to stimulate the curiosity of the child and lead not only to an early recognition of the various characters but also to their locations on a standard typewriter or computer keyboard.

Briefly described, the educational toy includes a plastic or other nonmagnetic base having a plurality of slots arranged in a plurality of lateral rows across the base. In the bottom of each slot of the plurality is a smaller second slot which extends completely through the base to a ferromagnetic bottom cover plate. The bars are designed to fit into corresponding slots and second slots and have top surfaces that are keyboard key shaped, each being labelled with an alphanumeric or other keyboard character. Thus, a bar must have an overall configuration that mates into a corresponding lateral surface slot and a bottom surface extension shaped to mate with the second slot. A small magnet embedded in the bottom surface of each keyboard bar contacts the metal bottom cover plate to prevent accidental removal of the bar.

DESCRIPTION OF THE DRAWINGS

In the drawings which illustrate the preferred embodiment of the invention.

DETAILED DESCRIPTION

Figure 1:
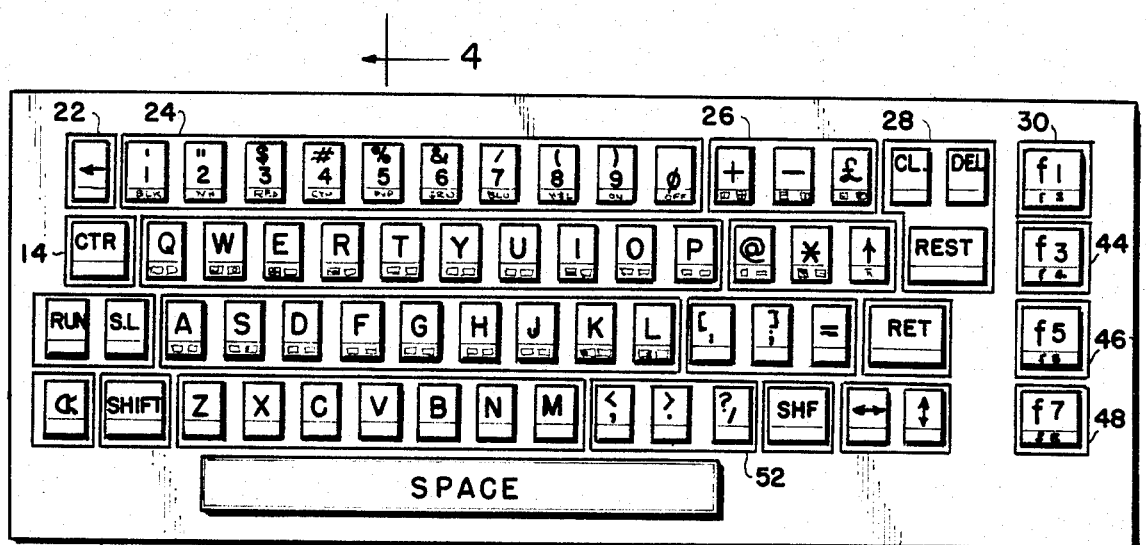
FIG. 1 is plan view of the educational toy with assembled keyboard.

FIG. 1 is a plan view of the educational toy designed to appear as a typical computer keyboard. Any design of a typewriter or computer keyboard may be used and, for example, the illustrated "QWERTY" board may be replaced with the "Dvorak" design.

Figure 2:
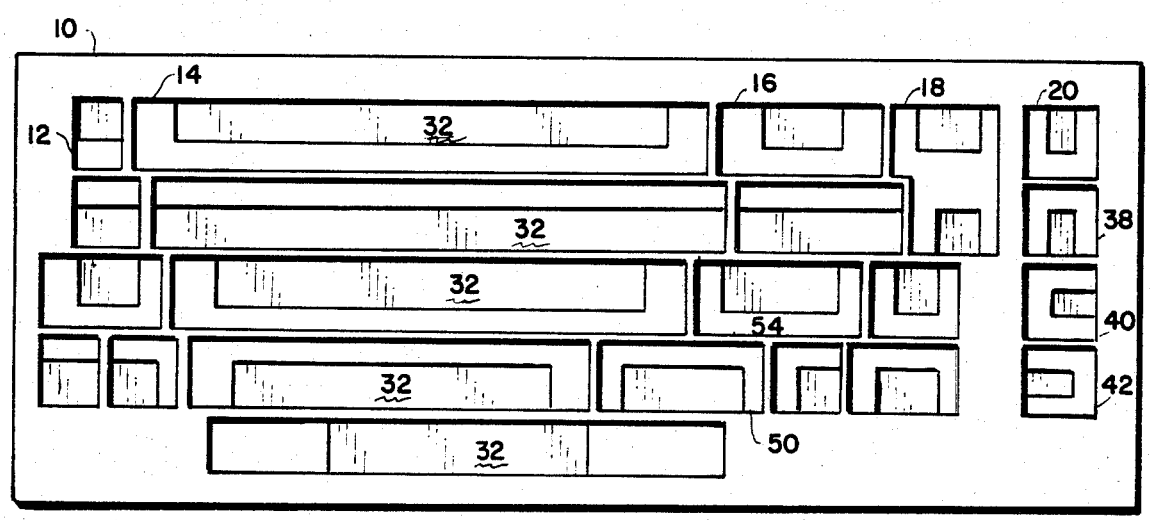
FIG. 2 is a top plan view of the base with keyboard bars removed.

All keys on the keyboard are formed in the top surface of a keyboard bar which has a configuration that will fit within one of plurality of longitudinally aligned slots in the top surface of a non-magnetic substantially planar and rectangular base unit 10 illustrated in the plan view of FIG. 2. The base unit 10 contains a plurality of slots formed to a depth of approximately half the thickness of the the base unit. The slots are arranged in longitudinal rows corresponding in number and approximate spacing to the keyboard rows and space bar on a conventional keyboard. Thus in FIG. 2, the base unit 10 contains slots 12, 14, 16, 18 and 20 for respectively receiving the mating keyboard bars 22, 24, 26, 28 and 30 of FIG. 1. Some of the keyboard bars, such as the backspace bar 22 and function key 30, contain only one key; others such as bar 24 may contain several keys.

Figure 4:
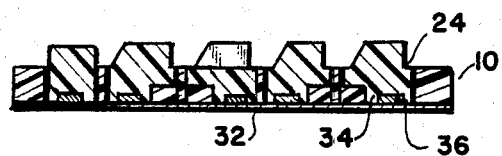
FIG. 4 is a sectional view taken along the lines 4—4 of FIG. 1.

Each of the plurality of longitudinally aligned surface slots of FIG. 2 contain a second slot which is formed in the lower surface of the surface slot and which extends through the lower surface of the non-magnetic material of the base unit 10 to expose therethrough the top surface of a ferromagnetic lower surface cover plate 32 as shown in the sectional view of FIG. 4. Each keyboard bar is formed with a lower surface extension portion such as the portion 34 of FIG. 4, which contains a small embedded and cemented-in magnet 36 which magnetically engages the metallic cover plate 32 to prevent loss of a keyboard bar once it is in its proper slot.

Figure 3:
FIG. 3 is an end view of the assembled toy of FIG. 2.

It will be noted that some slots, such as the function key slots 20, 38, 40 and 42 of FIG. 2 are identical in size and have identically sized and shaped second slots but which are located in different positions in the surface slots. Any of the keyboard bars 30, 44, 46 and 48 of FIG. 1 may thus be engaged in any of these slots. But the slanted faces on the keys, shown in the end view of FIG. 3 or the sectional view of FIG. 4 would face in other directions on those key bars not in their proper slots. Furthermore, the characters on the keys will appear on their sides or inverted if not properly placed. Similarly the slots 50 for receiving the bar 52 containing a question mark could be exchanged, inverted, with the bar containing a semicolon in the slot 54, but again the slanted faces of the keys will face the opposite direction. Thus, each of the slots have a unique combination of surface slots and second slots so that only one keyboard bar can properly fit therein.

It will be understood that any combination of surface slot lengths and the positions of the second through-slots may be used. For example, the toy may employ many identically sized keyboard bars each having thereon only one character or function key and having a lower surface extention portion configuration that will mate with a unique combination of two or more second slots formed at corner, edge, and/or center positions in the bottom surfaces of its short surface slot.

I claim:

1. An educational toy comprising:
   a base unit having substantially coplanar top and bottom surfaces;
   a plurality of first slots in the top surface of said base unit, said slots extending partially through the thickness of said base unit and arranged in a plurality of substantially parallel rows across said top surface;
   at least one second slot formed in a portion of the bottom of each of said plurality of first slots, each of said second slots extending through the lower surface of said base unit, the configuration of the combined first and second slots being unique to each first slot in the plurality; and
   a plurality of keyboard bars each having a top and a bottom surface, each bar in said plurality having an exterior dimension adapted to fit within at least one of said first slots, each bar having a bottom surface extension that fits into a second slot in said base unit.

2. The educational toy claimed in claim 1 wherein the top surface of each of said plurality of keyboard bars is configured and labelled to resemble a key on a computer keyboard, and wherein said plurality of keyboard bars, when positioned in their respective slots in said base unit, appear in correct keyboard order.

3. The educational toy claimed in claim 1 wherein the bottom surface of said base unit has an attached ferromagnetic cover plate covering each second slot in said base unit, and wherein the bottom surface of a bottom surface extension on each of said keyboard bars has a magnet embedded therein for magnetic adhesion of the keyboard bar to said cover plate.

4. The educational toy claimed in claim 2 wherein said base unit has a substantially rectangular surface configuration.

* * * * *